United States Patent [19]

Martukanitz

[11] Patent Number: 4,843,211
[45] Date of Patent: Jun. 27, 1989

[54] METHOD FOR WELDING ALUMINUM-MAGNESIUM-SILICON-COPPER ALLOYS

[75] Inventor: Richard P. Martukanitz, Greensburg, Pa.

[73] Assignee: Aluminum Company of America, Pittsburgh, Pa.

[21] Appl. No.: 26,945

[22] Filed: Mar. 17, 1987

[51] Int. Cl.⁴ ................................................ B23K 9/23
[52] U.S. Cl. ...................... 219/137 WM; 219/146.22
[58] Field of Search ...... 219/137 R, 137 WM, 146.22

[56] References Cited

U.S. PATENT DOCUMENTS 2,812,419  11/1957  Chyle .......................... 219/137 WM
3,332,773  7/1967  Dudas et al. ..................... 219/137 R

FOREIGN PATENT DOCUMENTS 49-047127  12/1974  Japan .
077358  6/1981  Japan .

OTHER PUBLICATIONS

Cary, Howard B. *Modern Welding Technology*, Englewood Cliffs, N.J.: Prentice-Hall, Inc., 1979, pp. 431-433 and 436-441.

Primary Examiner—Clifford C. Shaw
Attorney, Agent, or Firm—Max L. Williamson; Daniel A. Sullivan; Douglas Mueller

[57] ABSTRACT

A process for welding 6XXX copper-containing alloy members which includes using a 5XXX aluminum filler alloy having an Mg content from 7.0 to 8.5% by weight.

5 Claims, 1 Drawing Sheet

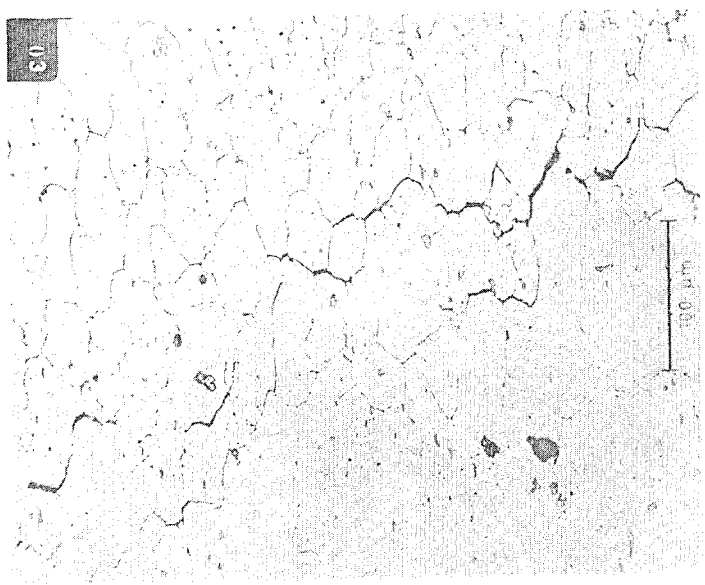
FIG. 2 - Insert of Figure 1 showing partially melted areas (250X - HF/H$_2$SO$_4$ etch).
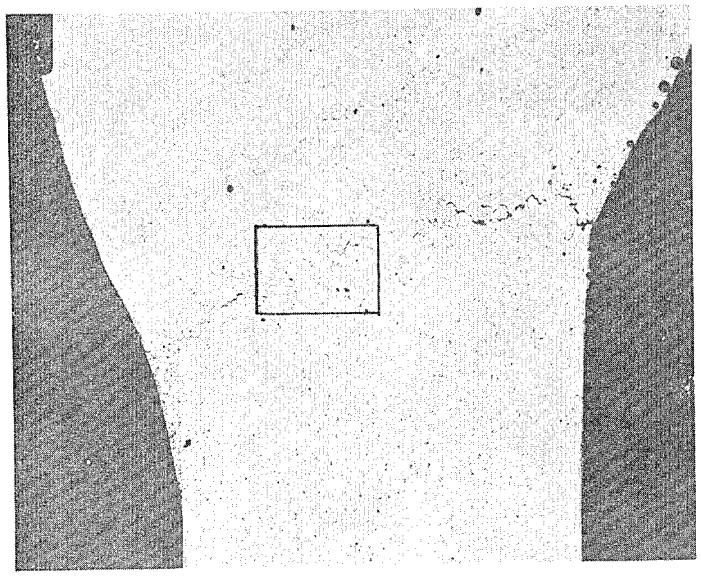
FIG. 1 - Cross section of 6013-T4/5356 butt weld showing fusion line cracking (50X - HF/H$_2$SO$_4$ etch).

METHOD FOR WELDING ALUMINUM-MAGNESIUM-SILICON-COPPER ALLOYS

BACKGROUND OF THE INVENTION

This invention relates to welding aluminum-magnesium-silicon-copper alloys wherein aluminum comprises more than 90% of the composition.

Because of increasing emphasis on reducing weight in automobiles, major efforts have been made to develop aluminum alloys which are suitable for use as body sheet and structural frame members. Those efforts have led to the development of new 6XXX magnesium silicide alloys, such as 6009, 6010 and 6013, for example, which have desirable characteristics and properties for structural applications such as relatively high mechanical properties, can be cold-formed, as relatively economical to fabricate in extruded or sheet form and have excellent corrosion resistance. In addition, these alloys are suitable for welding by gas tungsten arc (GTA) or gas metal arc (GMA) welding methods when using 4043, 4145, 4047 or other aluminum-silicon alloy filler metals. Although welds made using 4XXX alloys for filler metals are satisfactory in many instances, welds using 5XXX alloy filler metals are generally preferred for structural applications because of their relatively high weld strength and ductility. These newly developed 6XXX alloys were evaluated for joining by arc welding with a conventional 5356 alloy filler metal, and it was discovered that satisfactory welds could not be consistently produced. Cracking along the fusion line between the weld and parant metal was visually evident in some welds after applying die penetrant. In others, the cracks were not visually evident but their presence as small, incipient cracks was evident from the premature failure of test specimens in tension and elongation well below expected values.

It is believed that cracking adjacent to the welds when using 5XXX filler metal is a function of the amount of copper present in the base alloy, since the newly developed alloys such as 6009, 6010 and 6013 have a higher copper content than conventional, commercial 6XXX alloys available heretofore. To enhance the use of 6XXX copper-bearing alloys and take advantage of their many desirable properties and characteristics, it would be advantageous to provide a filler metal which could be used with such alloys without generating cracks in the fusion zone between the weldment and parent metal.

SUMMARY OF THE INVENTION

A 5XXX series alloy having a minimum of 7.0% magnesium is used by a method of this invention to weld copper bearing 6XXX alloy members.

It is an objective of this invention to provide a method for GMA or GTA welding of 6XXX alloy members which will produce ductile, relatively high-strength, crack-free welds therebetween.

This and other objectives and advantages of this invention will be more apparent with reference to the following description of a preferred embodiment and accompanying drawings.

BRIEF DESCRIPTION OF THE DRAWINGS

FIG. 1 is a photomicrograph of a cross section showing the interface between a thin sheet of 6013-T4 aluminum alloy and the fusion zone of a GTA weld of 5356 aluminum alloy enlarged 50 times actual size.

FIG. 2 is a photomicrograph of that portion of FIG. 1 outlined by the rectangle enlarged 250 times actual size.

DESCRIPTION OF A PREFERRED EMBODIMENT

A preferred embodiment of this invention is described with respect to making butt welds between pieces of 0.064 inch thick 6013-T4 aluminum sheet alloy. It is understood that a method of welding of this invention is not limited to butt welding nor to 6013-T4 alloy.

To make a comparative evaluation of the present invention, a number of samples of 0.064 inch thick 6013-T4 aluminum alloy sheet were GTA welded using 5356 alloy weld wire and a 5XXX alloy having at least a 7.5% magnesium content (hereafter designated experimental 5XXX for convenince). The samples included butt, fillet, and double lap joints both parallel to and transverse to the direction of rolling. After welding, the samples were inspected for the presence of cracks and at least one sample having a 5356 weld and a weld using experimental 5XXX filler metal were physically tested to compare mechanical properties.

The 6013-T4 sheet sample had a composition within the following percentage limits:

| Si | Fe | Cu | Mn | M | Cr | Zn | Ti | Others Each | Total | Al |
|---|---|---|---|---|---|---|---|---|---|---|
| 0.60–1.0 | 0.5 max | 0.6–1.1 | 0.2–0.8 | 0.8–1.2 | 0.10 max | 0.25 max | 0.10 max | 0.05 | 0.15 | Remainder |

The 5356 alloy filler material had a composition falling within the following percentage limits:

| Si | Fe | Cu | Mn | Mg | Cr | Zn | Ti | Be | Others Each | Total | Al |
|---|---|---|---|---|---|---|---|---|---|---|---|
| 0.25 max | 0.40 max | 0.10 max | 0.05–0.20 | 4.5–5.5 | 0.05–0.20 | 0.10 | 0.06–0.20 | 0.0008 max | .05 | 0.15 | Remainder |

The experimental 5XXX weld wire had a composition within the following percentage limits:

| Si | Fe | Cu | Mn | Mg | Zn | Ti | Others Each | Total | Al |
| --- | --- | --- | --- | --- | --- | --- | --- | --- | --- |
| .15 max | .15 max | 0.10 max | .30–.70 | 7.5–8.5 | .25 max | .05–.20 | .05 | 0.15 | Remainder |

All of the alloy compositions recited herein are expressed as percentages by weight unless otherwise noted.

Welding parameters were: 95 amperes and 17 volts; 30 CFH argon shielding gas; 3/32-inch diameter pure tungsten electrode; and 1/16-inch diameter welding rod. Samples were welded both parallel and transverse to the direction of rolling.

After welding, the samples were die penetrant inspected for fusion zone interface cracking, some of the samples were physically tested to determine their mechanical properties, and other samples were examined metallographicaly. Of four samples which were butt welded with 5356 weld wire, die penetrant gave clear evidence of cracking on two of them. One of the samples which evidenced cracking was then examined metallographically and the cracking may be seen in FIG. 1 to extend along the weld zone/base metal interface. Under further magnification of the area shown in the rectangle in FIG. 1, the cracking may be seen as occurring along the grain boundaries. In contrast, none of the samples welded with experimental 5XXX alloy showed any indication of cracking along the weld zone/base metal interface.

The other two samples welded with 5356 filler metal did not show evidence of cracking and were tensile tested. These two samples failed at the fusion line at lower levels of stress than comparative samples using the experimental alloy. It was also noted that the failure of the comparative samples was in the heat affected zone, as expected, rather than the fusion line between the weld zone and base metal. Even though the two samples welded with 5356 showed no cracking to the naked eye, magnified examination after failure showed incipient cracks were present to cause premature failure.

Although I do not intend to be bound by any theory, it is believed that the cracking is related to the formation of copper-containing eutectic phases at grain boundaries of the 6XXX base metal. During welding, a partially welded zone is created adjacent to the weld due to melting of grain boundary films of eutectic compositions. If the weld pool solidifies prior to the healing (resolidification) of these films, shrinkage strains may cause separation at grain boundaries, as may be seen in FIG. 1. The temperature at which solidification strains are induced is closely related to the formation of a critical amount of solid formed during solidification; shrinkage strains are generally thought to be induced at approximately 80% solid formation. If the temperature at which the 80% solid formation, and hence solidification shrinkage, is reduced, temperatures in the partially melted zone may be low enough to cause healing of the melted films. Thus, shrinkage strains are induced, but separation at grain boundaries does not occur.

Increasing the solute, i.e., magnesium, in the 5XXX filler metal lowers the temperature at which shrinkage strains are induced, and thus decreases the sensitivity to cracking at the fusion zone/base metal interface when welding copper-bearing 6XXX alloys.

As noted heretofore, the invention is described with respect to welding 6013-T4 members together. The invention is not limited to 6013-T4 alloy, however, and is useful for welding 6XXX alloys within the following percentage composition limits:

| Si | Fe | Cu | Mn | Mg | Cr | Zn | Ti | Others Each | Total | Al |
| --- | --- | --- | --- | --- | --- | --- | --- | --- | --- | --- |
| 0.20–1.2 | 0.70 max | 0.1–1.1 | 0.8 max | 0.8–1.2 | 0.35 max | 0.25 max | 0.15 max | .05 | 0.15 | Remainder |

Further tests which were conducted to insure the suitability of a method of this invention for welding 6XXX copper-bearing alloy structural members were accelerated stress corrosion tests. In these tests, samples were made up by gas metal arc welding an extrusion to a casting to make an assembly. The assembly was then stressed as a beam as it was alternately immersed in a 3½% NaCl solution and then exposed to the air. The casting was made from an alloy having a typical composition of: Al-10.0Si-0.20Mg, and the typical composition of the alloy from which the extrusion was made is: Al-0.8Si-0.6Mg-0.4Cu. A number of assemblies were made using experimental 5XXX alloy hving a typical Mg content of 8% as filler metal and other assemblies were made using 4XXX alloys as filler metal. The applied stress on each assembly varied from a low of 12.8 ksi on one assembly to a high of 20.9 ksi on two assemblies. The majority of the assemblies were given a low temperature aging after welding, as would be typical in at least an autobody application. After 8 months of testing, not a single assembly welded with experimental alloy 5XXX had failed, in contrast to failure of all of the assemblies using a 4XXX filler wire. Days to failure on those assemblies which failed varied from 41 days to 221 days, and in each case the failure occurred on the extrusion side of the weld. The performance of the assemblies welded with the experimental 5XXX filler alloy was surprisingly good. Previous tests made on plate samples of the experimental 5XXX alloy of this invention had indicated at high susceptibility to stress corrosion cracking depending upon the test solution used and the low temperature aging history. Based on these previous tests on plate samples, the superior performance of samples tested having the experimental 5XXX as a component in the weld was unexpected.

While the invention has been described in terms of preferred embodiments, the claims appended hereto are intended to encompass all embodiments which fall within the spirit of the invention.

What is claimed is:

1. A process for welding an assembly of members with at least one of the members being made of a 6XXX aluminum alloy, comprising:
   providing at least two members to be welded together, at least one of the members being made of a 6XXX aluminum alloy having Cu as one of its constituents; and welding the members together with a 5XXX aluminum filler alloy containing 7.0 to 8.5% Mg as one of its constituents.

2. A process as claimed in claim 1 wherein in the step of providing members at least one of the members is made of a 6XXX alloy having 0.1 to 1.1% Cu.

3. A process as claimed in claim 1 wherein in the step of providing members at least one of the members is an aluminum alloy consisting essentially of 0.20 to 1.2% Si, 0.7% max. Fe, 0.1 to 1.1% Cu, 0.8% max. Mn, 0.8–1.2% Mg, 0.35% max. Cr. 0.25% max. Zn, 0.15% max. Ti, balance aluminum.

4. A process as claimed in claim 1 wherein in the welding step the filler alloy consists essentially of 0.15% max. Si, 0.15% max. Fe, 0.10% max. Cu, 0.30 to 0.70% Mn, 7.0 to 8.5% Mg, 0.05 to 0.20% Cr, 0.25% max. Zn, 0.20% max. Ti, balance aluminum.

5. A process as claimed in claim 1 wherein both members to be welded are made of a 6XXX alloy having Cu as one of its constituents.

* * * * *

UNITED STATES PATENT AND TRADEMARK OFFICE
CERTIFICATE OF CORRECTION

PATENT NO. : 4,843,211

DATED : June 27, 1989

INVENTOR(S) : Richard P. Martukanitz

It is certified that error appears in the above-identified patent and that said Letters Patent is hereby corrected as shown below:

Col. 2, line 39      Change "convenince" to --convenience--.

First Table Heading      Change "M" to --Mg--.

Col. 4, line 34      Change "hving" to --having--.

Signed and Sealed this

Twenty-second Day of May, 1990

Attest:

HARRY F. MANBECK, JR.

*Attesting Officer*      *Commissioner of Patents and Trademarks*